Patented May 9, 1933

1,908,004

UNITED STATES PATENT OFFICE

JOHN C. ZOLA, OF TARENTUM, PENNSYLVANIA, ASSIGNOR TO DUPLATE CORPORATION, A CORPORATION OF DELAWARE

LAMINATED GLASS AND PROCESS OF MAKING THE SAME

No Drawing.    Application filed March 3, 1931. Serial No. 519,899.

The invention relates to laminated or safety glass which ordinarily consists of two sheets of glass cemented by a suitable binding material to the opposite sides of a sheet of tough reinforcing material, such as cellulose ester plastic of which celluloid is a common example. Among the cements heretofore employed are certain of the synthetic resins, such as the various condensation products. These cements have in general certain favorable characteristics, one of which is that the sheets will not separate due to the absorption of water by the cement, since most of these synthetic resin cements are water insoluble or largely so. One disadvantage is involved, however, in that the weathering properties and durability are not good unless the cellulose ester plastic is relatively dry, so that special preparation of the plastic is required when synthetic resin water insoluble cements are used. One purpose of this invention is to overcome this difficulty by modifying the water insoluble resin cement so that it will hold under varying conditions of moisture content in the plastic.

A further object of the invention is to cheapen the process of applying the cement. Heretofore, water insoluble resin cements have been applied to the sheets by dissolving them in a solvent and then spraying the solution onto the sheets in a thin film which was dried out, either in part, or in whole, before laminating the sheets together under heat and pressure in the usual way. The cost of solvents required in this operation is high, and some means for disposing of the vapor produced is required, thus adding complication and expense to the procedure. I have found that this situation may be improved by forming an emulsion of the resin in water, the mixture then being sprayed onto the sheets, the laminating procedure then following that above described. This eliminates the cost of solvent, either in part, or in whole, and the water vapor added to the atmosphere is unobjectionable. In order to emulsify the resin, it is ordinarily first dissolved in a small amount of solvent preliminary to the agitation necessary to emulsify, but in some cases, all solvent may be omitted by the use of emulsifying agents which are not solvents but which maintain the dispersion of the resin through the water to form the emulsion. Among the emulsifiers which may be used are sodium oleate, oleic acid, saponin and soap. In those cases in which the resin is first dissolved in a solvent preliminary to emulsifying, it is also desirable to use one of the emulsifiers listed above in order to prevent coalescence of the dispersed resin in water particles.

A list of the synthetic resin cements of the non-water soluble type which may be mixed with water soluble cements or adhesives to secure the first object above discussed are polyhydric alcohol polybasic acid condensation products, sometimes referred to as glyptal resins, polyvinyl acetates or chloracetates, phenol formaldehyde condensation products, urea formaldehyde condensation products, and toluene sulfonamide derivatives.

A list of the water soluble cements or adhesives which may be mixed with the non-water soluble cements above specified are gelatine, casein, albumins, gums of the arabic, cherry, tragacanth, dextrine and seaweed group, the organic borates, such as casein borate, starch borate, and diethylene glycol borate, the starches, and some of the synthetic resins, such as polyhydric alcohol boric acid condensation products, (one of which is known as, glycol bori borate) citric acid glycerine condensation products, urea formaldehyde resin, dimethyol urea, and dimethyl thiourea. Some of these synthetic resins must be used in an intermediate or arrested stage of condensation in order that they shall be soluble in water. The water soluble and non-water soluble cements may be mixed in varying proportions. A 50—50 mixture will ordinarily give good results. Most of the above water soluble materials, such as the starch, gelatine, casein, and albumin assist in stabilizing the emulsion containing the non-water soluble resins, and are useful for that purpose, even if their presence in some cases adds little to the holding power of the resins with which they are associated.

In forming the emulsion for spraying purposes, the water insoluble cement may first be dissolved in a small amount of solvent, after which such solvent and the water soluble cement are thoroughly dispersed by agitation through the main body of emulsifying water. The ratio of cement to water may vary within considerable limits, but the cement will ordinarily range from 1 to 5 per cent of the mixture.

As a specific example of the proportions of solvent and water used satisfactorily with a mixture of equal parts of two synthetic resins, one non-water soluble, and the other water soluble, the following solution is given:

|  | Per cent |
|---|---|
| Water | 75 |
| Heavy naphtha | 11¼ |
| Toluol | 11¼ |
| Ethyl acetate | 2½ |

The water soluble synthetic resin used in the above example was the so-called glycol bori borate, heretofore referred to. Any of the other water soluble cements or adhesives heretofore specified might be substituted for this cement. Many materials may be used to advantage for this purpose whose holding power as cements is practically negligible or very slight, such as starch, gum arabic and others.

The non-water soluble synthetic resin used in the above was a glycerol sebacic acid condensation product described in my copending application, Serial No. 519,897, of even date herewith, but it will be understood that any of the heretofore listed non-water soluble synthetic resin cements or combinations thereof might be substituted.

What I claim is:

1. A laminated plate comprising a glass sheet, a sheet of cellulose ester plastic and a binder between the sheets comprising a mixture of water soluble cement and a synthetic resin cement which is non-water soluble.

2. A laminated plate comprising a glass sheet, a sheet of cellulose ester plastic and a binder between the sheets comprising a mixture of a water soluble synthetic resin cement and a synthetic resin cement which is non-water soluble.

3. A laminated plate comprising a glass sheet, a sheet of cellulose ester plastic and a binder between the sheets comprising a mixture of a water soluble cement and a non-water soluble resin cement of the polyhydric alcohol polybasic acid condensation group.

4. A laminated plate comprising a glass sheet, a sheet of cellulose ester plastic and a binder between the sheets comprising a mixture of a water insoluble synthetic resin and a water soluble natural gum.

5. A process of laminating a sheet of glass and a sheet of cellulose ester plastic which consists in forming in water an emulsion of a non-water soluble cement, spraying the surface of one of the sheets with the emulsion, allowing the sprayed film or coat to dry in part at least, and then assembling the sheets and applying heat and pressure thereto.

6. A process of laminating a sheet of glass and a sheet of cellulose ester plastic which consists in forming in water an emulsion of a non-water soluble synthetic resin cement, spraying the surface of one of the sheets with the emulsion, allowing the sprayed film or coat to dry in part at least and then assembling the sheets and applying heat and pressure thereto.

7. A process of laminating a sheet of glass and a sheet of cellulose ester plastic which consists in forming in water an emulsion of a water soluble cement and a non-water soluble synthetic resin cement spraying the surface of one of the sheets with the emulsion, allowing the sprayed film or coat to dry in part at least and then assembling the sheets and applying heat and pressure thereto.

8. A process of laminating a sheet of glass and a sheet of cellulose ester plastic which consists in dissolving a non-water soluble synthetic resin cement in a solvent, forming in water an emulsion of the solvent carrying the cement, spraying the surface of one of the sheets with the emulsion, allowing the sprayed film or coat to dry in part at least and then assembling the sheets and applying heat and pressure thereto.

In testimony whereof, I have hereunto subscribed my name this 29th day of January, 1931.

JOHN C. ZOLA.